United States Patent

Fritz et al.

[15] 3,636,267

[45] Jan. 18, 1972

[54] ARRANGEMENT FOR THE RECIPROCAL ACCEPTANCE OF CALLS

[72] Inventors: Robert Fritz; Horst Beckh; Norbert Torggler, all of Munich, Germany

[73] Assignee: Siemens Aktiengesellschaft, Berlin and Munich, Germany

[22] Filed: June 9, 1969

[21] Appl. No.: 831,308

[30] Foreign Application Priority Data

June 10, 1968 Germany ......................P 17 62 398.2

[52] U.S. Cl. ......................................................179/18 BD

[51] Int. Cl. ......................................................H04m 3/54

[58] Field of Search............179/18 BD, 18 BE, 27 FG, 27 FF

[56] References Cited

UNITED STATES PATENTS

| | | | |
|---|---|---|---|
| 3,327,064 | 6/1967 | Braund et al. | 179/18 BD |
| 3,334,191 | 8/1967 | Arseneau et al. | 179/18 BE |
| 3,341,663 | 9/1967 | Stefano | 179/27 FH |
| 3,449,527 | 6/1969 | Strobelt et al. | 179/18 BD |

*Primary Examiner*—Kathleen H. Claffy
*Assistant Examiner*—David L. Stewart
*Attorney*—Irons, Birch, Swindler & McKie

[57] ABSTRACT

A centrally controlled telephone exchange installation having a plurality of subscriber stations authorized to accept calls for each other wherein a call from a calling repeater for one subscriber station is indicated to the other subscriber stations with an arrangement for the acceptance of a call for a subscriber station by another authorized subscriber station. A centrally arranged storage means is provided and assigned to all subscriber stations authorized for the reciprocal acceptance of calls to mark a call for one of the subscriber stations, and store the address of the calling repeater. An authorization storage, the authorization for the reciprocal acceptance of calls for the subscriber stations being marked therein to determine the address of the centrally arranged storage means corresponding to the assignment of the said one of the subscriber stations to the centrally arranged storage means, is also included.

3 Claims, 1 Drawing Figure

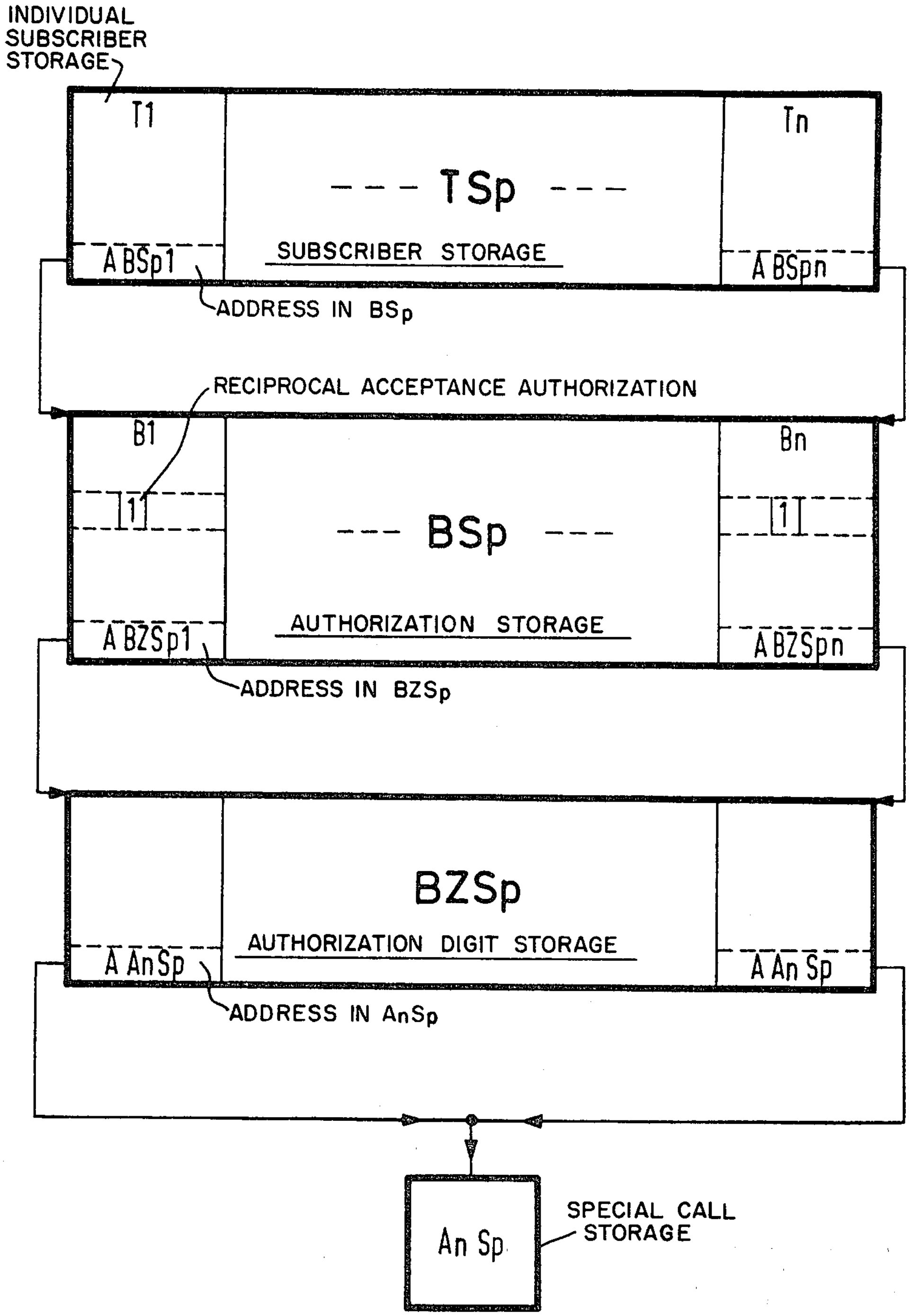
INDIVIDUAL SUBSCRIBER STORAGE
T1
Tn
TSp
SUBSCRIBER STORAGE
ABSp1
ABSpn
ADDRESS IN BSp
RECIPROCAL ACCEPTANCE AUTHORIZATION
B1
Bn
1
1
BSp
AUTHORIZATION STORAGE
ABZSp1
ABZSpn
ADDRESS IN BZSp
BZSp
AUTHORIZATION DIGIT STORAGE
A AnSp
A An Sp
ADDRESS IN AnSp
An Sp
SPECIAL CALL STORAGE

ARRANGEMENT FOR THE RECIPROCAL ACCEPTANCE OF CALLS

REFERENCE TO PRIORITY APPLICATION

Applicants claim priority from the corresponding German Application Ser. No. P 17 62 398.2, filed June 10, 1968, in Germany.

BACKGROUND OF THE INVENTION

1. Field of the Invention

The invention concerns an arrangement for the taking over of a call for one subscriber station by another subscriber station in centrally controlled exchange installations having central memories, in particular telephone exchange installations. Authorized subscriber stations are arranged in such a way that the call for one subscriber station can be noticed by the others, and is particularly useful for subscriber stations in offices or residences.

2. Description of the Prior Art

In exchange installations, in particular telephone exchange installations, circuit arrangements for call rerouting and for transferring of calls are known. A subscriber can effect, for example, through the selection of a rerouting identification number and another subscriber identification number, that calls arriving for his subscriber station can be rerouted to the other subscriber station. In order to carry out the transferring operation it is generally the case that calls arriving for a first subscriber station are forwarded to another subscriber station after a certain time period has elapsed, if the call is not answered at the first subscriber station.

Moreover, circuit arrangements are known wherein calls can be answered by any of a plurality of authorized subscriber stations through dialing of an identification number; see, for example, German Pat. No. 1,263,106. The identity of the answering subscriber station and the identity of the calling repeater or the repeater through which a call is being placed to the group of subscribers in question, must therefore be determined, so that a connection can be established from the answering subscriber station to the repeater.

SUMMARY OF THE INVENTION

The present invention is based on a specific task. Assume that several subscriber stations are located in an office or residence. It is further assumed that the call for one subscriber station can be observed by the others; for example, in an office the ringing of the alarm can distinctly be heard by all subscribers present. Thus it often happens that a subscriber who is present is to take a call arriving for a subscriber station of an absent subscriber. It is desirable in this case that the subscriber does not have to leave his place of work in order to take the call. The arrangement according to the invention now offers a solution to this problem for centrally controlled telephone exchange installations, in particular.

The arrangement according to the invention is characterized by the combination of the following characteristics:

a. There is assigned to all subscriber stations authorized for the reciprocal acceptance of calls, a special centrally arranged storage means for the identification of a call for one of the said subscriber stations and for the storing of the address of the calling repeater;

b. The authorization for the reciprocal acceptance of calls for the subscriber stations is marked in an authorization storage means present in a centrally controlled installation and developed in known manner;

c. That with the authorization marking for the said subscriber stations in the authorization storage means, the address of the special storage means (that is, the assignment of the said subscriber stations to the special storage means) is determined.

Thus the arrangement according to the invention assigns to all subscriber stations authorized for the reciprocal acceptance of calls, a common storage means wherein in simple manner the marking of a call to one of the authorized subscriber stations and the address of the calling repeater are stored. Thus, a signal is given to the effect that a call can be answered by another authorized subscriber station. On the other hand, the address of the calling repeater is also retained at the same time, so that a connection from the answering subscriber to the calling repeater can be established in the manner customary in a centrally controlled installation, without the necessity of a renewed marking or identification of the calling repeater. Moreover, the arrangement according to the invention has the advantage that the general answering of this call by authorized subscribers does not have to be carried out through dialing of certain identification numbers. Thus a subscriber who wishes to answer a call for an absent subscriber on his own apparatus does not have to make the effort to memorize code numbers or to look up code numbers. He can take such a call simply by lifting his receiver.

A further development of the invention concerns a method for accepting a call for one subscriber station by another subscriber station utilizing the arrangement according to the invention. This method is characterized by the fact that in the case of a call for one of the said subscriber stations, after the inquiry as to authorization of the called subscriber station, the signal for the authorization to take over the call and the address of the calling repeater are recorded in the special storage means, so that thereafter the taking over of the call by authorized subscriber stations is possible.

The prerequisite for the arrangement and method according to the invention is that a call for one of the subscriber stations authorized for the reciprocal acceptance of calls, can be observed at the other subscriber stations; thus these subscriber stations are located, for example, in an office or in a dwelling. Any kind of forwarding or rerouting of calls is therefore no longer required. In the circuit arrangement according to the invention the call always reaches the called subscriber station only.

BRIEF DESCRIPTION OF THE DRAWINGS

The FIGURE shows the arrangement according to the invention.

DETAILED DESCRIPTION OF THE INVENTION

The invention and the preferred embodiment thereof described herein find their application in centrally controlled or program controlled telephone exchange installations having central memories. These are well known in the art, and it is contemplated that such conventional installations be used in conjunction with the invention described herein. The invention described herein is concerned with a particular memory arrangement to be used in such installations to achieve the described results. Accordingly, an entire centrally controlled telephone exchange installation is not described herein, but only that portion which pertains to the invention and is necessary to enable one skilled in the art to make and use it, is described. Further, the elements constituting the memories are themselves conventional, and it is only the particular arrangement of memories and the necessary peripheral equipment which need be described in order to understand the invention.

To each of the subscriber stations a memory location is assigned in the centrally arranged subscriber storage means TS*p*. For example, to a first subscriber station storage place T1 and to an $n^{th}$ subscriber station storage place T*n* are assigned. It shall be assumed that the first and the $n^{th}$ subscriber stations belong to a group of subscriber stations which are to have the authorization to reciprocally answer arriving calls. In subscriber storage means TS*p*, inter alia the addresses of the memory locations are stored which are assigned to the individual subscriber stations in authorization storage BS*p*. This storing of the addresses is to be indicated by the designations ABS*p*1 and ABS*pn*, respectively, for the first and $n^{th}$ positions. The memory locations in authorization storage BS*p* are designated by B1 to B$n$. There are also stored in these storage places, in addition to other authorizations, the authorization for the reciprocal acceptance of calls, for example, represented by "1," and the address of a memory location which is assigned to a subscriber station in the so-called authorization digit storage BZS$p$. The storing of these addresses is shown by the designations ABZ$p$1, and ABZS$pn$, respectively, for the first and $n^{th}$ positions.

In authorization digit storage BZS$p$, which is generally used for the storage of short call numbers and the like, there is now at the place marked by the address in authorization storage BS$p$, the address of the special storage which is assigned to all subscriber stations that are authorized for the reciprocal acceptance of calls. This method of addressing is indicated by AA$n$S$p$ in authorization digit storage BZS$p$.

Thus subscriber stations which are assigned to a special call storage ANS$p$ can take each others calls. If it is desired in an installation that subscriber stations of a further group of subscriber stations are to be able to reciprocally accept calls, then only a further call storage A$n$S$p$ need be provided, which is addressed appropriately, and assigned to these other subscriber stations.

In the following explanation the different cases shall be described which can occur if a subscriber station of one group with the authorization to accept calls is called. The subscriber of a group called by a subscriber of the same installation or by the public exchange, shall be assumed to be the subscriber B1. Subscriber B2 shall be assumed to be any other subscriber of the group which can take the call.

B1-Subscriber is called

Within the framework of inquiries as to authorization which normally take place in a central memory, in the case of arriving traffic additional inquiry is made as to the authorization for the reciprocal acceptance of calls in authorization storage BS$p$. If the B1-subscriber has this authorization, a first timer (not shown) which for example can have a duty time of 5 seconds, is set. During this period of time (5 seconds) only the B1-subscriber can answer the call. The program proceeds in this case the same as a normal connection; that is, a connection is established between the B1-subscriber and the calling repeater in the exchange installation. If another subscriber with authorization for the reciprocal acceptance of calls lifts his receiver, a normal departing call results for him.

After the first time period (5 seconds) has elapsed, an inquiry is made as to whether in call storage A$n$S$p$ the so-called call signal is set, which indicates that a call exists to the group of the authorized subscribers. If in call storage A$n$S$p$ a call signal is already set, it means that a call already exists which can be answered by all authorized subscribers. If no call signal is set, then after the expiration of the first time generator a call signal is set. Likewise the address of the arriving seized repeater is recorded. After these processes also, another subscriber of the group of authorized subscribers, for example the B2-subscriber, can answer the call. It shall be mentioned that the first timer is provided to afford a called subscriber the possibility to answer an arriving call destined for him with certainty, and that no other subscriber of the group of the authorized subscribers takes it first. This first timer, however, is not a necessary part of the invention as the call signal and the address of the arriving seized repeater can already be recorded in call storage A$n$S$p$ after the inquiry as to authorization of the called subscriber, so that immediately after calling all subscribers authorized therefore can take the call by lifting the receiver.

If the call signal is already set in call storage A$n$S$p$, a second timer is started and after elapse of the corresponding second time period thereof call storage A$n$S$p$ is again checked to see if it is free. Through the repeated attempts to record the call signal, if a call signal is already recorded in call storage A$n$S$p$, it is guaranteed that calls arriving simultaneously or in short succession for a subscriber station of a group of subscriber stations authorized to take over calls can be processed successively in simple manner.

It should be mentioned that the first timer can also be used as the second timer. The theoretical distinction between two timers was made for the purpose of making clear that the two time supervision processes are two different processes.

For the further progress of the connection three possibilities can arise:

1. B1-Subscriber answers

If the B1-subscriber answers after the first time period has already elapsed, call storage A$n$S$p$ is cancelled and the call for the B1-subscriber disconnected. If the first time period has not yet elapsed when the B1-subscriber answers, only the timer is cancelled, as the call storage A$n$S$p$ had not yet been used. In both instances the connection establishment continues as in a normal arriving connection.

2. B2-Subscriber answers the call

Upon lifting of the receiver by the B2-subscriber, within the inquiries as to authorization, additional inquiry is made as to the authorization for the reciprocal acceptance of calls in authorization storage BS$p$. If the subscriber does not have this authorization, then a normal departing connection is established for him. However, if the authorization exists further inquiry must be made as to whether in call storage A$n$S$p$ the call signal (a subscriber of the group of the authorized subscribers is just being called) is set. If the signal is not set, there again results a normal connection establishment. However, if the call signal is set, the actual program for the taking over of the call proceeds through subscriber B2 as follows:

Cancellation of call storage A$n$S$p$,
Path finding, arriving seized repeater B2-subscriber,
Disconnect call to B1-subscriber,
Release path arriving seized repeater B1-subscriber,
Set path arriving seized repeater B2-subscriber.
Now the B2-subscriber conducts the rerouted call.

3. No subscriber of the group of authorized subscribers answers, calling subscriber replaces receiver.

In a principal storage wherein the state of the connection is marked, it is also shown by a special signal whether a call storage A$n$S$p$ contains recordings. Now if the calling subscriber replaces the receiver without having had an answer from a B-subscriber, the principal storage is scanned for this signal. If this signal is set, then in addition to the other processes the call storage A$n$S$p$ must again be cancelled, or a normal release process exists.

We claim:

1. In a centrally controlled telephone exchange installation having a central memory and having a plurality of subscriber stations including a number of subscriber stations authorized to accept calls for each other wherein a call from a calling repeater for one of said authorized subscriber stations is indicated to the others of said authorized subscriber stations, a central memory arrangement for the acceptance of a call to one of said authorized subscriber stations by another authorized subscriber station comprising:

common storage means in said central memory connectable to each of said authorized subscribers for registering information as to the existence of a call to one of said number of authorized subscribers and for registering the address of the calling repeater, said call information and said address causing said authorized subscriber to be connected to said calling repeater, authorization storage means in said central memory containing a storage location for each said subscriber, the storage location for each said authorized subscriber containing an authorization code permitting connection of said authorized subscriber to said common storage means and connection of call information to one of said authorized subscribers to said common memory and address information for access to said common storage means by said authorized subscriber and by call signals to said authorized subscriber.

2. The exchange installation defined in claim 1, further comprising:

first timing means in said central memory actuated in response to a call to one of said authorized subscribers to measure a first predetermined time period and for enabling only the one of said authorized subscribers called to be connected to said calling repeater during said first predetermined time period and means for enabling said common storage means to register said call information to one of said authorized subscribers after the elapse of said first predetermined period of time.

3. The exchange installation defined in claim 2 further comprising:

second timing means for measuring a second predetermined period of time actuated responsive to a call signalled to one of said authorized subscribers and a determination that call information already exists in said common storage means for enabling the registration of information regarding said call signal in said common storage means after the elapse of said second predetermined period of time.

* * * * *